United States Patent [19]

Saito et al.

[11] Patent Number: 4,977,679

[45] Date of Patent: Dec. 18, 1990

[54] AZIMUTH SIGNAL GENERATOR

[75] Inventors: Takahiro Saito; Junichi Ito, both of Tokyo, Japan

[73] Assignee: Japan Aviation Electronics Industry Limited, Tokyo, Japan

[21] Appl. No.: 416,688

[22] Filed: Oct. 3, 1989

[30] Foreign Application Priority Data

Oct. 28, 1988 [JP] Japan .................. 63-274101

[51] Int. Cl.$^5$ ............... G01C 19/36; G01C 17/28
[52] U.S. Cl. ........................ 33/316; 33/326; 33/356; 33/361; 33/362; 364/453; 364/449
[58] Field of Search .......... 33/316, 17 R, 317 D, 33/318, 319, 324, 326, 361, 362, 356, 355 R, 333, 357, 359; 364/457, 453, 449, 454; 73/504, 517 A

[56] References Cited

U.S. PATENT DOCUMENTS

| | | | |
|---|---|---|---|
| 3,837,086 | 9/1974 | James | 33/317 D |
| 4,106,094 | 8/1978 | Land | 364/453 |
| 4,197,655 | 4/1980 | Moore | 33/361 |
| 4,254,465 | 3/1981 | Land | 364/453 |
| 4,379,365 | 4/1983 | Riethmiiller et al. | 33/316 |
| 4,386,535 | 6/1983 | Albert | 763/504 |
| 4,583,178 | 4/1986 | Ameen et al. | 364/453 |
| 4,621,529 | 11/1986 | Pittman | 73/504 |
| 4,711,125 | 12/1987 | Morrison | 73/517 A |
| 4,715,227 | 12/1987 | Pittman | 73/504 |
| 4,807,138 | 2/1989 | Krogmann | 364/453 |
| 4,823,626 | 4/1989 | Hartman et al. | 364/453 |
| 4,831,544 | 5/1989 | Hojo et al. | 364/453 |
| 4,862,398 | 8/1989 | Shimizu et al. | 364/457 |
| 4,866,627 | 9/1989 | Suyama | 364/457 |
| 4,870,602 | 9/1989 | Bäumker | 33/357 |
| 4,890,233 | 12/1989 | Ando et al. | 346/457 |

Primary Examiner—William A. Cuchlinski, Jr.
Assistant Examiner—William C. Dowling
Attorney, Agent, or Firm—Pollock, VandeSande and Priddy

[57] ABSTRACT

In an azimuth signal generator for an automobile navigation system a change in the rotational rate of an inertia rotary member, which has its rotary shaft held vertically and is driven at substantially a constant speed, is detected as a direction changing rate of the car and the direction changing rate is integrated by an integrator to obtain an azimuth signal. On the other hand, the azimuth of geomagnetism is detected by a geomagnetic azimuth sensor and a correcting signal is produced based on an error between the azimuth signal and the geomagnetic azimuth signal. The correcting signal is negatively feedback to the input side of the integrator, causing the azimuth signal to follow the geomagnetic azimuth signal.

4 Claims, 4 Drawing Sheets

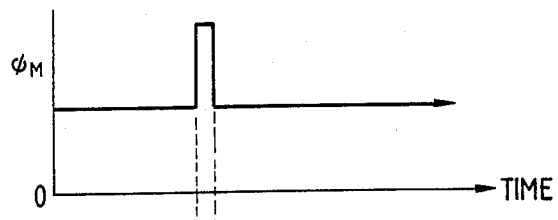
FIG. 6A
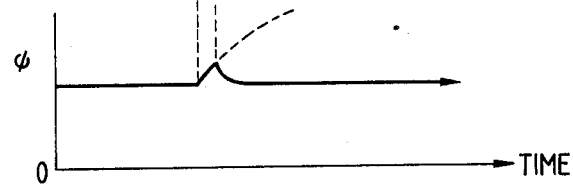
FIG. 6B
FIG. 7
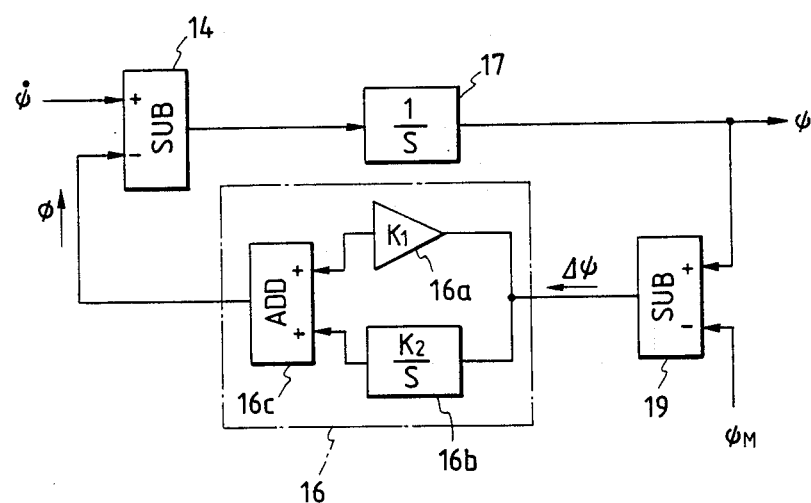

AZIMUTH SIGNAL GENERATOR

BACKGROUND OF THE INVENTION

The present invention relates to a low-cost azimuth signal generator suitable for use in an automobile navigation system or the like.

Conventional azimuth signal generators are, in general, geomagnetic azimuth sensors (such as a magnetic compass, a flux valve, etc.) and a gyrosyn compass. The gyrosyn compass is employed primarily for aircrafts and has an arrangement in which an azimuth gyro is controlled using a signal detected by a flux valve (a sensor mounted on an airplane at a position where the influence of electricity and magnetism is slight, such as the wing tip or tail, for detecting the direction of the horizontal component of the vector of geomagnetism) so that the spin axis of the azimuth gyro is always directed to the direction of the horizontal component of geomagnetism to eliminate a drift of the azimuth gyro in the direction of its spin axis (which is attributable to friction of gyro bearings, imbalance of the gyro structure, the influence of rotation of the earth, and so forth), thereby accurately detecting the angle of heading of the plane. No detailed description will be given of the conventional azimuth signal generators, because they are well-known in the art.

The conventional geomagnetic azimuth sensors are low-cost but they are susceptible to the influence of magnetic fields other than geomagnetism, such as magnetic fields which are developed by electrical machinery and apparatus of vehicles and electric railways, and consequently, measurement errors remain large unless measured values are properly processed. On the other hand, the gyrosyn compass is free from the influence of such magnetic fields except earth magnetism but is expensive, in general, and hence is not suitable for use in a car navigation system, because the azimuth gyro has a high precision, complex structure for high-speed rotation and therefore is costly.

SUMMARY OF THE INVENTION

It is therefore an object of the present invention to provide an azimuth signal generator which is free from the influence of magnetic fields except for geomagnetism, low-cost and suitable for use in an automobile navigation system.

The azimuth signal generator of the present invention comprises an inertia sensor which includes a case which is mounted on the body of a car, a rotary disc rotatably housed in the case with its rotary shaft held vertically and having a ring portion for increasing the momentum, a drive means mounted on the case for driving the rotary disc at a predetermined rotational rate, bar codes provided at regular intervals on the outer peripheral surface of the rotary disc, and a bar code sensor mounted on the case for detecting the bar codes; a flux valve which detects geomagnetism and yields a geomagnetic azimuth signal $\psi_M$ on the basis of the geomagnetic north; a direction changing rate detecting circuit which includes a counter circuit which counts bar code signals from inertia sensor and produces a rotational rate signal $\dot{\theta}$ of the case relative to the rotary disc, a reference rotational rate setting register which sets therein a reference rotational rate $\dot{\theta}_0$ of the rotary disc and creates a reference rotational rate signal $\dot{\theta}_0$ (based on the earth), and a first subtractor which subtracts the reference rotational rate signal $\dot{\theta}_0$ from the relative rotational rate signal $\dot{\theta}$ of the case to obtain a direction changing rate signal $\dot{\psi} = \dot{\theta} - \dot{\theta}_0$ of the car body; a second subtractor for subtracting a correcting signal $\phi$ from the direction changing rate signal $\dot{\psi}$; an integrator for integrating the output of the second subtractor to produce an azimuth signal $\psi$ of the car body; a third subtractor for subtracting the geomagnetic azimuth signal $\psi_M$ from the azimuth signal $\psi$ of the car body to obtain an error signal $\psi - \psi_M$; and a correcting signal generator which amplifies the error signal $\psi - \psi_M$ to generate the correcting signal $\phi$ for input into the second subtractor, controlling it to reduce the error signal $\psi - \psi_M$ to zero.

The correcting signal generator may preferably be made up of an amplifier for amplifying the error signal $\psi - \psi_M$, an integrator for integrating the error signal $\psi - \psi_M$, and an adder for adding together the outputs of the integrator and the amplifier to generate the correcting signal $\phi$.

BRIEF DESCRIPTION OF THE DRAWINGS

FIGS. 6A and 6B are graphs showing variations of the geomagnetic azimuth signal $\psi_M$ and the output azimuth signal $\psi$ of the azimuth signal generator caused by a magnetic field disturbance in the embodiment of FIG. 1; and FIG. 7 is a block diagram illustrating the principal part of another embodiment of the present invention.

DESCRIPTION OF THE PREFERRED EMBODIMENTS

Figure 1:
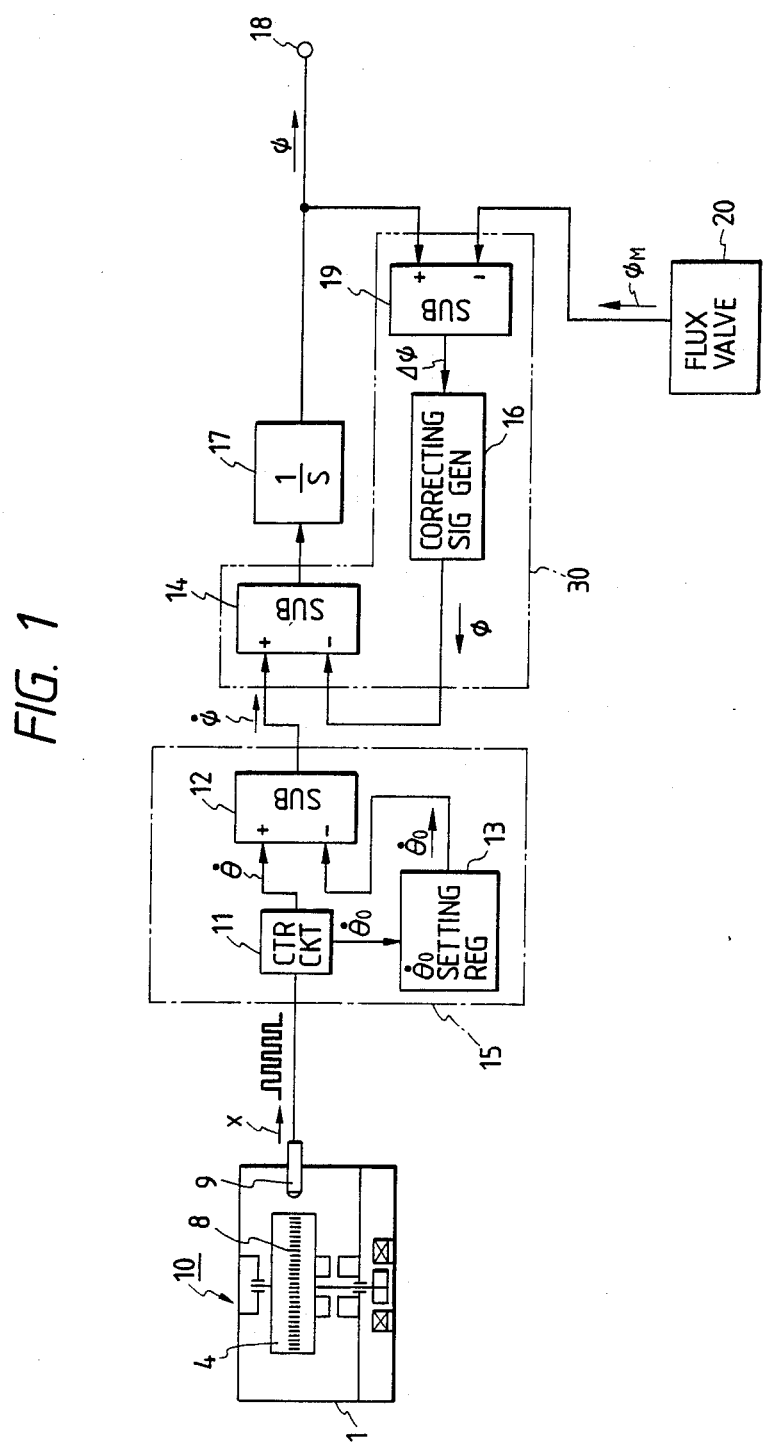
FIG. 1 is a block diagram illustrating an embodiment of the present invention.

FIG. 1 illustrates in block form an embodiment of the azimuth signal generator of the present invention which is used in a car navigation system, for instance. The azimuth signal generator comprises an inertia sensor 10, a direction changing rate detecting circuit 15 which creates a direction changing rate signal $\dot{\psi}$ on the basis of an inertia signal x which is applied thereto from the inertia sensor 10, an integrator 17 which integrates the direction changing rate signal $\dot{\psi}$ to yield an azimuth signal $\psi$, a flux valve 20 whereby an azimuth based on the geomagnetism is detected as a geomagnetic azimuth signal $\psi_M$ and a negative feedback loop 30 whereby a correcting signal $\phi$ generated based on a difference between the azimuth signal $\psi$ and the geomagnetic azimuth signal $\psi_M$ is negatively fed back to the input of the integrator 17.

With the above arrangement, it is possible to produce a stable azimuth signal $\psi$, even if the geomagnetic azimuth signal $\psi_M$ detected by the flux valve 20 undergoes temporary variations owing to the oscillatory motion of the car or external magnetic disturbances. A detailed description will be given of each of the components.

(A) Inertia Sensor

Figure 2A:
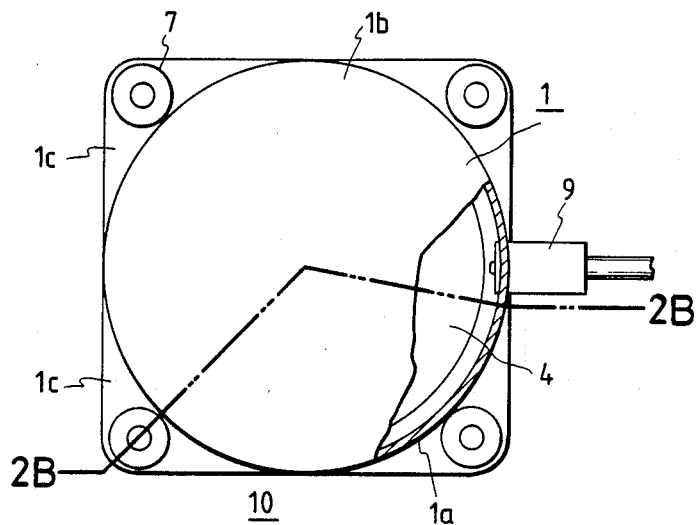
FIG. 2A is a plan view of an inertia sensor 10 in FIG. 1.
Figure 2B:
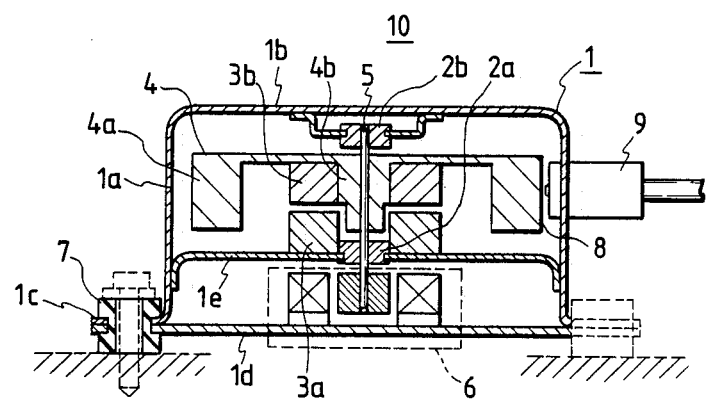
FIG. 2B is a sectional view of the inertia sensor taken on the line 2B—2B in FIG. 2A.

FIG. 2A is a plan view, partly cut away, of the inertia sensor 10 and FIG. 2B is a sectional view taken on the line 2B—2B in FIG. 2A. The inertia sensor 10 is fixedly mounted on a car (not shown) with a rotary shaft 5 of its rotary inertia member (comprising a rotary disc 4, a ring portion 4a, a second magnet 3b and the shaft 5) held vertically to the body of a car. Accordingly, the rotary shaft 5 is held vertical to a plane in which the car is moving.

A cylindrical member 1a, which forms a case 1 of the inertia sensor 10, has a top panel 1b formed integrally therewith and a flange 1c which extends outward from the low peripheral edge of the cylindrical member 1a radially thereof. The flange 1c, in this example, is generally square and the length of each side is substantially equal to the outer diameter of the cylindrical member 1a. The lower opening of the cylindrical member 1a is closed with a bottom panel 1d of the same shape as that of the flange 1c. In the case 1 there is mounted a disc-shaped intermediate panel 1e which has an outer diameter nearly equal to the inner diameter of the cylindrical member 1a and has a centrally-disposed circular hole, in which a bearing 2a is disposed. The bearing 2a is surrounded by a ring-shaped first magnet 3a fixed to the top surface of the intermediate panel 1e by means of adhesive, for example. The second magnet 3b of substantially the same shape as that of the first magnet 3a is disposed above the magnet 3a in adjacent but spaced and coaxial relation thereto, with their magnetic poles of the same polarity held face-to-face with each other.

The rotary disc 4, whose outer diameter is smaller than the inner diameter of the cylindrical member 1a, has on its underside the ring portion 4a which extends down vertically therefrom about its periphery and a columnar boss 4b which also extends down vertically from its central portion. The rotary disc has its boss 4b fitted in a center hole of the second magnet 3b and is mounted on and united thereto with a joining material, for instance. The free end portion of the boss 4b projecting out downwardly of the center hole of the second magnet 3b has an outer diameter smaller than the diameter of the center hole and extends down into a center hole of the first magnet 3a but stays above the bearing 2a. The boss 4b has a through hole along its axis, which has press-fitted thereinto the rotary shaft 5 both ends of which project out upwardly and downwardly of the boss 4b, respectively. The lower projecting end portion of the rotary shaft 5 passes through the center hole of the bearing 2a, while the upper projecting end is journaled to a bearing 2b disposed on the inside of the top panel 1b centrally thereof. The rotary disc 4 is rotatably supported with its rotary shaft 5 journaled to the bearings 2a and 2b. The magnetic forces of the first and second magnets 3a and 3b are slightly unbalanced within the range of 360 degrees and the frictional forces of the bearings 2a and 2b are also unbalanced, but such unbalance does not matter in particular, because the rotary disc 4 is driven at a low speed of hundreds of revolutions per minute, for instance. The rotary disc 4 has the ring portion 4a, and hence is heavy at its peripheral portion and has a large moment of inertia, and consequently, the rotary disc 4 has a property of rotating at a constant speed. The intermediate panel 1e is secured to the interior surface of the cylindrical member 1a while holding the rotary disc 4 in cooperation with the top panel 1b.

On the top surface of the bottom panel 1d there is mounted a drive means 6 which engages the rotary shaft 5 for driving the rotary disc 4 at a predetermined rotational rate. The flange 1c and the bottom panel 1d are screwed together to the body of the car through rubber washers 7. The cylindrical member 1a, the top panel 1b, the flanges 1c, the bottom panel 1d, and the intermediate panel 1e constitute the case 1.

The outer peripheral surface of the ring portion 4a of the rotary disc 4 bears equally-spaced-apart bar codes (graduations in this example) 8 in parallel to the rotary shaft 5 (see FIG. 1). A bar code sensor 9 is mounted on the cylindrical member 1a, for optically sensing the bar codes 8. As the rotary disc 4 rotates, the bar code sensor 9 yields, as the inertia signal x, a bar code signal which has one pulse for each graduation.

(B) Flux Valve

The flux valve 20 employed in the present invention is basically identical with the conventional magnetic compass. The flux valve 20 creates the geomagnetic azimuth signal $\psi_M$ on the basis of the geomagnetic north. Since there is a difference, commonly referred to as variation or declination, between the direction of the horizontal component of the geomagnetic vector (the geomagnetic north) and the geographical north, it is evident that it is possible to use an azimuth signal obtained by correcting the output of the flux valve 20 by the declination, but the following description will be given in connection with the case of using the geomagnetic azimuth signal $\psi_M$ detected by the flux valve 20.

(C) Direction Changing Rate Detecting Circuit

Figure 3:
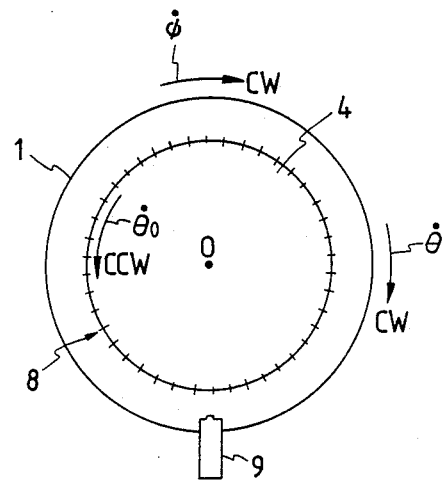
FIG. 3 is a schematic diagram for explaining the directions of rotation of a rotary disc 4 and a case 1 in the inertia sensor 10.

The frequency of the inertia signal x available from the inertia sensor 10 corresponds to the rotational rate of the rotary disc 4 relative to the case 1 (and consequently the body of the car), and at the same time, it corresponds also to the rotational rate of the case 1 (the body of the car) relative to the rotary disc 4. In the present invention, as shown in FIG. 1, the number of pulses of the inertia signal or bar code signal x are counted by a counter circuit 11 every fixed period, and a rotational rate signal $\dot{\theta}$ of the case 1 relative to the rotary disc 4 is provided to one input terminal of a subtractor 12. The relative rotational rate signal $\dot{\theta}$ has a magnitude proportional to the frequency of bar code signal x. Now, let it be assumed, for the sake of convenience, that the relative rotational rate signal $\dot{\theta}$ is positive for the clockwise rotation of the case 1 as shown in FIG. 3.

While the car is at a standstill (or moving without changing its direction), the rotary disc 4 is driven by the drive means 6 at substantially a constant rotational rate $\dot{\theta}_0$ (which is relative to the ground or earth and is assumed, for the sake of convenience, to be positive for the counterclockwise rotation of the rotary disc 4). The value of the rotational rate $\dot{\theta}_0$ is premeasured by the counter circuit 11 when the car is at a standstill and is set in a reference rotational rate setting register 13, from which it is always provided as a reference rotational rate signal $\dot{\theta}_0$ to the other input terminal of the subtractor 12.

The subtractor 12 subtracts the reference rotational rate signal $\dot{\theta}_0$ from the relative rotational rate signal $\dot{\theta}$ of the case 1, yielding the direction changing rate signal $\dot{\psi}$ (relative to the earth and positive for the clockwise rotation) of the case 1 (and consequently the body of the car), that is, $$\dot{\psi} = \dot{\theta} - \dot{\theta}_0 \ldots \quad (1)$$

Figure 4:
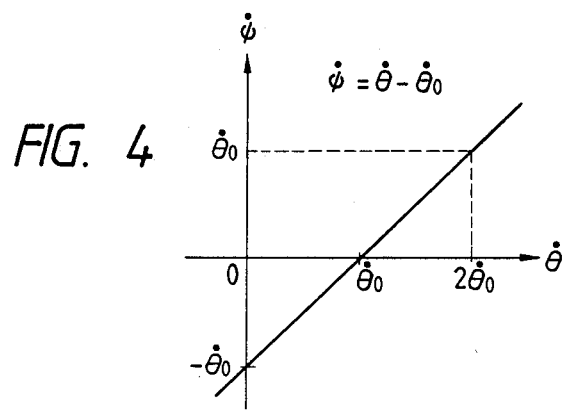
FIG. 4 is a graph showing the relationship between the direction changing ratio $\dot{\psi}$ and a relative rotational rate $\dot{\theta}$ in the embodiment depicted in FIG. 1.

In expression (1) the signals $\dot{\psi}$ and $\dot{\theta}$ are both positive for the clockwise rotation of the case 1 (i.e. the counterclockwise rotation of the rotary disc 4), whereas the signal $\dot{\theta}_0$ is positive for the counterclockwise rotation of the rotary disc 4 (see FIG. 4). The relation of expression (1) is shown in FIG. 4.

The counter circuit 11, the subtractor 12, and the reference rotational rate setting register 13 constitute the direction changing rate detecting circuit 15.

(D) Integrator and Negative Feedback Circuit

In a subtractor 14 the correcting signal $\phi$ from a correcting signal generator 16 is subtracted from the direction changing rate signal $\dot{\psi}$ applied from the direction changing rate detecting circuit 15, and as a result of this, a corrected direction changing rate signal $\dot{\psi} - \phi$ is provided to the integrator 17. The integrator 17 integrates the signal $\dot{\psi} - \phi$ and supplies an output terminal 18 and one input terminal of a subtractor 19 with the signal $\psi$ which represents the present direction of the car body with respect to the geomagnetic north, that is, the rotational angle of the car body. In the embodiment depicted in FIG. 1 the correcting signal generator 16 is an amplifier of an amplification factor K and yields the correcting signal $\phi$ proportional to the output of the subtractor 19, i.e. an error signal $\Delta\psi = \psi - \psi_M$. That is, $\phi = K \cdot \Delta\psi$, where K is an amplification coefficient greater than 0. The subtractor 19, the correcting signal generator 16, and the subtractor 14 constitute the negative feedback loop 30, which controls the azimuth signal $\psi$ to agree with the geomagnetic azimuth signal $\psi_M$ available from the flux valve 20.

The output azimuth signal $\psi$ at the output terminal 18 of the azimuth signal generator is applied to one input terminal of the subtractor 19, whereas the geomagnetic azimuth signal $\psi_M$ is applied to the other input terminal of the subtractor 19. By the subtraction of these signals in the subtractor 19 the error signal $\Delta\psi = \psi - \psi_M$ is produced, which is provided to the correcting signal generator 16. In the correcting signal generator 16 the error signal $\Delta\psi$ is amplified by the factor of K and is provided, as the correcting signal $\phi = K(\psi - \psi_M)$, to the other input terminal of the subtractor 14, wherein the direction changing ratio signal $\dot{\psi}$ is corrected by $\phi$. That is to say, the negative feedback loop 30 operates so that the error signal $\Delta\psi = \psi - \psi_M$ is reduced to zero. Consequently, in the steady state the azimuth signal $\psi$ agrees with the geomagnetic azimuth signal $\psi_M$ and no correcting signal $\phi$ is developed.

Figure 5:
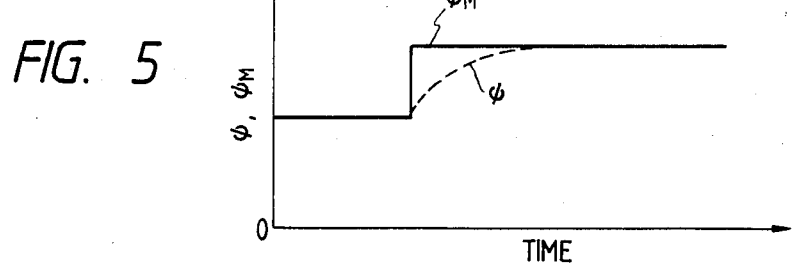
FIG. 5 is a graph showing variations of the geomagnetic azimuth signal $\psi_M$ and the output azimuth signal $\psi$ the azimuth signal generator in response to a sudden change in the direction of a car in the embodiment depicted in FIG. 1.

If the direction of the car body changes when the azimuth signal generator is yielding the azimuth signal $\psi$ equal to the geomagnetic azimuth signal $\psi_M$ as described above, the direction changing ratio signal $\dot{\psi}$ is varied accordingly, and it is integrated by the integrator 17, changing the azimuth signal $\psi$. In this instance, if there is a difference between the azimuth signal $\psi$ and the geomagnetic azimuth signal $\psi_M$, then the former is corrected to gradually approach the latter in the above-described manner as shown in FIG. 5.

Even if the geomagnetic azimuth signal $\psi_M$ undergoes a temporary variation, as shown in FIG. 6A, under the influence of an external magnetic field when the car crosses the railway tracks at a crossing, for instance, this variation is supplied via the negative feedback loop 30 and the integrator 17 to the output side, and consequently, the azimuth signal $\psi$ undergoes substantially no variation as depicted in FIG. 6B. In other words, the azimuth signal $\psi$ is not affected by a temporary short-term disturbance of the external magnetic field or the like.

The foregoing description has been given on the assumption that when the car maintains a straight course without changing its direction, the count value of the counter circuit 11 at every fixed period, that is, the rotational rate $\dot{\theta}$ of the rotary disc 4, is equal to the initialized reference value $\dot{\theta}_0$. In practice, however, the rotation of the rotary disc 4 deviates, though slightly, from the initialized reference value $\dot{\theta}_0$ and slowly varies for a long period of time. In such a case, the component of deviation is always contained in the direction changing rate signal $\dot{\psi}$. Consequently, the deviation component is continuously integrated by the integrator 17 with the result that the negative feedback loop 30 operates in such a manner as to provide $\dot{\psi} = \phi$, and the azimuth signal $\psi$ deviates in a particular direction from the geomagnetic azimuth signal $\psi_M$ for a long period of time. Such a deviation cannot be eliminated only by control with the correcting signal generator 16 which has a mere linear amplifying function, and an error $\Delta\psi = \dot{\psi}/K$ would be introduced between the azimuth signal $\psi$ and the geomagnetic azimuth signal $\psi_M$.

FIG. 7 illustrates, by way of example, the arrangement of the correcting signal generator 16 designed for solving the above-mentioned problem. As depicted in FIG. 7, the correcting signal generator 16 comprises an amplifier 16a, an integrator 16b, and an adder 16c. The error signal $\Delta\psi = \psi - \psi_M$ from the subtractor 19 is applied to the amplifier 16a of an amplification factor $K_1$ and the integrator 16b of a gain $K_2$ from which signals $K_1(\psi - \psi_M)$ and $(K_2/S)(\psi - \psi_M)$ are produced and applied to the adder 16c, wherein they are added together. Here, 1/S is the symbol of an integrating operator. The added output signal $(K_1 + K_2/S)(\psi - \psi_M)$ from the adder 16c is provided as the correcting signal $\phi$ to the subtractor 14. With such an arrangement, even if the afore-mentioned deviation component is contained in the direction changing rate signal $\dot{\psi}$, the resulting error signal $\Delta\psi$ is integrated by the integrator 16b and the negative feedback loop 30 operates to continue the integration until the deviation component in the direction changing rate signal $\dot{\psi}$ is completely eliminated. Consequently, in the steady state $\dot{\psi} = \phi$, that is, the output of the adder 14 is zero, and $\Delta\psi = \psi - \psi_M = 0$, that is, azimuth signal $\psi$ is equal to the geomagnetic azimuth signal $\psi_M$.

As described above, even if the steady rotational rate of the rotary disc 4 slowly deviates from the reference rotational rate $\dot{\theta}_0$ over a long period of time, the error signal $\Delta\psi$ is integrated by the integrator 16b, by which the deviation component in the direction changing rate signal $\dot{\psi}$ can be cancelled. This means that the reference rotational rate $\dot{\theta}_0$, which is initialized in the reference rotational rate setting register 13, need not always agree with the steady-state rotational rate of the rotary disc 4 but may be a desired fixed value. Namely, the reference rotational rate $\dot{\theta}_0$ may also be zero, in which case the reference rotational rate setting register 13 and the subtractor 12 can be left out and the relative rotational rate signal $\dot{\theta}$ from the counter circuit 11 is applied intact as the direction changing rate signal $\dot{\psi}$ to the subtractor 14.

As described above, the azimuth signal generator of the present invention will not be affected by magnetic field disturbances unlike the conventional geomagnetic azimuth sensors. Furthermore, since the inertia sensor 10 need not be an expensive azimuth gyro or the like but may be one that is formed by a low-speed, simple-structured rotating mechanism, and since the circuit arrangement for processing the inertia signal detected by the inertia sensor 10 is simple, the azimuth signal generator of the present invention is extremely low-cost as compared with the conventional gyrosyn compass, and hence is suitable for use in an automobile navigation system and the like.

It will be apparent that many modifications and variations may be effected without departing from the scope of the novel concepts of the present invention.

What is claimed is:

1. An azimuth signal generator comprising:
a case to be fixedly mounted on the body of a vehicle;
an inertia rotary member housed in said case, with its rotary shaft held vertically;
a drive means mounted on said case, for rotating said inertia rotary member;
a relative rotational rate detecting means for detecting the rotational rate of said inertia rotary member relative to said case to provide a relative rotational rate signal;
a first subtracting means supplied with said relative rotational rate signal from said relative rotational rate detecting means and a correcting signal, for subtracting said correcting signal from said relative rotational rate signal;
an integrating means for integrating the subtracted output from said first subtracting means to provide the result of integration as an azimuth signal;
a geomagnetic azimuth detecting means for producing a geomagnetic azimuth signal in accordance with an azimuth of the geomagnetism;
a second subtracting means supplied with said azimuth signal from said integrating means and said geomagnetic azimuth signal from said geomagnetic azimuth detecting means, for providing the difference therebetween as an error signal;
a correcting signal generating means for creating said correcting signal in accordance with said error signal from said second subtracting means and supplying said correcting signal to said first subtracting means;
said inertia rotary member having boar codes provided at equiangular intervals on its outer peripheral surface, said relative rotational rate detecting means including a bar code sensor fixedly mounted on said case in opposed relation to said outer peripheral surface of said inertia rotary member for detecting said bar codes to produce an inertia signal containing pulses corresponding to said bar codes detected, and a counting means which receives said inertia signal, counts the number of said pulses per unit time and outputs, as said relative rotational rate signal, a signal corresponding to the count value;
and said relative rotational rate detecting means including a setting means for initializing, as a reference value, the count value of said counting means during the steady state rotation of said inertia rotary member, and a third subtracting means for obtaining a difference between said count value of said counting means and said reference value from said setting means to obtain the difference as said relative rotational rate signal.

2. The azimuth signal generator of claim 1, wherein said correcting signal generating means includes an amplifying means for amplifying said error signal from said second subtracting means, an error integrating means for integrating said error signal, and an adding means for adding together the outputs of said amplifying means and said error integrating means to obtain said correcting signal.

3. An azimuth signal generator comprising: a case to be fixedly mounted on the body of a vehicle;
an inertia rotary member housed in said case, with its rotary shaft held vertically;
a drive means mounted on said case, for rotating said inertia rotary member;
a relative rotational rate detecting means for detecting the rotational rate of said inertia rotary member relative to said case to provide a relative rotational rate signal;
a first subtracting means supplied with said relative rotational rate signal from said relative rotational rate detecting means and a correcting signal, for subtracting said correcting signal from said relative rotational rate signal;
an integrating means for integrating the subtracted output from said first subtracting means to provide the result of integration as an azimuth signal;
a geomagnetic azimuth detecting means for producing a geomagnetic azimuth signal in accordance with an azimuth of the geomagnetism;
a second subtracting means supplied with said azimuth signal from said integrating means and said geomagnetic azimuth signal from said geomagnetic azimuth detecting means, for providing the difference therebetween as an error signal; and
a correcting signal generating means for creating said correcting signal in accordance with said error signal from said second subtracting means and supplying said correcting signal to said first subtracting means, said correcting signal generating means including an amplifying means for amplifying said error signal from said second subtracting means, an error integrating means for integrating said error signal, and an adding means for adding together the outputs of said amplifying means and said error integrating means to obtain said correcting signal.

4. The azimuth signal generator of claim 3 wherein said inertia rotary member has bar codes provided at equiangular intervals on its outer peripheral surface and wherein said relative rotational rate detecting means includes a bar code sensor fixedly mounted on said case in opposed relation to said outer peripheral surface of said inertia rotary member, for detecting said bar codes to produce an inertia signal containing pulses corresponding to said bar codes detected, and a counting means which receives said inertia signal, counts the number of said pulses per unit time and outputs, as said relative rotational rate signal, a signal corresponding to the count value.

* * * * *